(12) United States Patent
Oishi

(10) Patent No.: US 8,960,398 B2
(45) Date of Patent: *Feb. 24, 2015

(54) CLUTCH OPERATION ASSISTING DEVICE AND POWER UNIT FOR STRADDLE-TYPE VEHICLE

(75) Inventor: Akifumi Oishi, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 1813 days.

This patent is subject to a terminal disclaimer.

(21) Appl. No.: 11/773,253

(22) Filed: Jul. 3, 2007

(65) Prior Publication Data

US 2008/0011575 A1 Jan. 17, 2008

(30) Foreign Application Priority Data

Jul. 5, 2006 (JP) ................................. 2006-185281

(51) Int. Cl.
 *F16D 23/12* (2006.01)
 *F16D 13/56* (2006.01)
 *B60K 23/02* (2006.01)

(52) U.S. Cl.
 CPC .......... *F16D 23/12* (2013.01); *F16D 2023/123* (2013.01)
 USPC ........................ 192/70.23; 192/96; 192/89.21

(58) Field of Classification Search
 USPC ......... 192/70.23, 89.21, 96, 20, 70.24, 89.29, 192/93 A
 See application file for complete search history.

(56) References Cited

U.S. PATENT DOCUMENTS 2,735,525 A 2/1956 Martindell
2,914,158 A 11/1959 Zeidler et al.
4,352,415 A * 10/1982 Powell ........................... 188/156
4,753,330 A * 6/1988 Ohzono et al. ............... 192/48.4
6,328,147 B1 * 12/2001 Fujita ........................... 192/70.23
8,136,648 B2 * 3/2012 Oishi et al. .................. 192/70.23
2005/0011719 A1 * 1/2005 Oishi et al. .................... 192/99 S
2009/0127063 A1 * 5/2009 Ishida .......................... 192/93 A

FOREIGN PATENT DOCUMENTS

| DE | 851875 | | 10/1952 |
| FR | 2549920 A1 | | 2/1985 |
| JP | 55-094028 | | 7/1980 |
| JP | 62184228 A | * | 8/1987 |
| JP | 07-132872 | | 5/1995 |

OTHER PUBLICATIONS

European Search Report for corresponding European application 07252599.1.

* cited by examiner

*Primary Examiner* — Gene Crawford
*Assistant Examiner* — Terry Chau
(74) *Attorney, Agent, or Firm* — Rabin & Berdo, P.C.

(57) ABSTRACT

A power unit for a motorcycle having a clutch operation assisting device. The clutch operation assisting device includes a push shaft, a bearing plate that supports the push shaft, and a first rotary plate rotatably supported on the bearing plate and connected to a clutch wire. The first rotary plate causes the push shaft to slide as it rotates and is gear-coupled to a second rotary plate. A spring unit that applies an assist force in a direction for disengaging a friction clutch is pin-coupled to the second rotary plate. The spring unit is supported on a mounting seat in a swingable manner and is installed such that, as viewed from the axial direction of the push shaft, the expansion/contraction direction of an auxiliary spring in the spring unit does not pass through a rotation center of the pressure plate.

19 Claims, 13 Drawing Sheets

(a)

(b)

(a)

(b)

(a)

(b)

(a)

(b)

(a)

(b)

(a)

(b)

CLUTCH OPERATION ASSISTING DEVICE AND POWER UNIT FOR STRADDLE-TYPE VEHICLE

RELATED APPLICATIONS

This application claims the benefit of priority under 35 USC 119 of Japanese patent application no. 2006-185281, filed on Jul. 5, 2006, which application is hereby incorporated by reference in its entirety.

BACKGROUND OF THE INVENTION

1. Field of the Invention

The present invention relates to a clutch operation assisting device for reducing the operating force for operating a friction clutch when disengaging the transmission of torque by the friction clutch, and a power unit and a straddle-type vehicle that are equipped with the clutch operation assisting device.

2. Description of Related Art

A power unit of a motorcycle may be equipped with a friction clutch for connecting/disconnecting the transmission of torque from an engine to a transmission. The friction clutch typically includes a clutch shaft, and a friction plate and a clutch plate that overlap each other in the axial direction of the clutch shaft (hereinafter, referred to as the clutch shaft direction). The friction clutch also includes a pressure plate which brings the friction plate and the clutch plate into pressure contact with each other, and a clutch spring for urging the pressure plate. The clutch spring keeps the friction clutch in a clutch-in state, enabling the transmission of torque.

Further, the friction clutch has a clutch release mechanism. The clutch release mechanism serves to release the pressure of the pressure plate by the clutch spring, and is connected to a clutch lever via a clutch wire. When the rider grips the clutch lever, the pressure plate slides against the urging force of the clutch spring, thus disengaging transmission of torque from the friction plate to the clutch plate.

In the case of a friction clutch used in a high output/high RPM engine, in order to achieve increased torque capacity, it is desirable to set the mounting load of the clutch spring high. However, since the clutch lever is operated with a human hand, increased mounting load of the clutch spring increases the burden on the rider when operating the clutch lever.

To alleviate this problem, in the related art, for example, there is known a clutch operation assisting device in which an assist mechanism for reducing the operating force for operating the clutch lever is attached to a clutch release mechanism to which a clutch wire is connected (for example, see JP-A-Hei 7-132872 and JP-A-Sho 55-94028 below).

The clutch operation assisting device disclosed in JP-A-Hei 7-132872 is arranged outside of a power unit. On the other hand, there is also a demand for such a clutch operation assisting device to be arranged inside the power unit. JP-A-Sho 55-94028 discloses a construction in which the clutch operation assisting device is arranged inside the power unit.

FIG. 13 depicts the clutch operation assisting device disclosed in JP-A-Sho 55-94028. It includes a rotatable push lever 525 connected to a clutch wire 528, and an auxiliary spring 529 for reducing the operating force for operating a clutch lever. One end 529a of auxiliary spring 529 is connected to push lever 525, and the other end of auxiliary spring 529 is connected to a connecting member 531 that is formed in a semi-arcuate shape. Push lever 525 is fixed to a push screw 517 positioned on a straight line extending through the plane of FIG. 13, and rotates integrally with push screw 517. Connecting member 531 is rotatably supported on and rotates around a pin 530.

When the clutch lever is in a so-called freeplay condition (a condition where no load is exerted even when the clutch lever is pulled), as indicated by the solid line in FIG. 13, auxiliary spring 529 is positioned on a straight line M1 extending between the rotation center C0 of push lever 525 and pin 530. Thus, the expansion/contraction direction of auxiliary spring 529 passes through rotation center C0 of push lever 525. Therefore, the urging force of auxiliary spring 529 does not act as a force for rotating push lever 525.

On the other hand, as indicated by the two-dot chain line in FIG. 13, when the clutch lever is pulled, push lever 525 is pulled along and pivots counterclockwise. As a result, the attitude of auxiliary spring 529 changes, and the expansion/contraction direction M2 of auxiliary spring 529 shifts from pivot center C0 of push lever 525. A part of the urging force of auxiliary spring 529 thus acts as a force for pivoting push lever 525 counterclockwise. Therefore, the urging force of auxiliary spring 529 acts as an assist force applied when pulling the clutch lever, thereby reducing the operating force for operating the clutch lever.

In the above-described clutch operation assisting device, auxiliary spring 529 changes its attitude while the clutch lever moves from an initial position where the clutch lever is in the freeplay condition to a disengage position for disengaging the friction clutch. In the initial position, the expansion/contraction direction M1 of auxiliary spring 529 passes through the axial center (rotation center C0) of push screw 517. Accordingly, auxiliary spring 529 must be installed along the radial direction from the axial center of push screw 517, which makes it difficult to secure a sufficient installation space for auxiliary spring 529. Further, it is difficult to secure a sufficient expansion/contraction length for auxiliary spring 529. Therefore, the power unit must be enlarged to secure a sufficient installation space for auxiliary spring 529.

SUMMARY OF THE INVENTION

The present invention has been made in view of the above-mentioned problems, and has as an object to reduce the size of a power unit incorporating a clutch operation assisting device.

The present invention provides a clutch operation assisting device in a clutch operating apparatus. The clutch operating apparatus includes a friction clutch that has a pressure plate and a clutch spring for urging the pressure plate, and is arranged in a casing of a power unit; and an operating member that is connected to the friction clutch via a transmission member, and is manually operated against an urging force of the clutch spring when disengaging transmission of torque by the friction clutch. The clutch operation assisting device is accommodated in the power unit casing and includes a slide member that rotatably supports the pressure plate and slides in a predetermined direction together with the pressure plate; a first rotary member that is connected to the transmission member, and rotates in accordance with the transmission member to cause the slide member to slide; and an auxiliary elastic member for, when operating the operating member in a direction for disengaging the friction clutch, applying an urging force while changing in its expansion/contraction direction during a period of time until the operating member reaches a disengage position where disengagement of the friction clutch is complete from a disengage start position where the operating member receives a reaction force of the clutch spring. The urging force causes the first rotary member to rotate in the direction for disengaging the friction clutch, and as viewed from a sliding direction of the slide member, the expansion/contraction direction of the auxiliary elastic member does not pass through the rotation center of the pressure plate.

According to the invention, since the expansion/contraction direction of the auxiliary elastic member does not pass through the rotation center of the pressure plate as viewed from the sliding direction of the slide member, there is no need to install the auxiliary elastic member along the radiation direction from the rotation center of the pressure plate. Therefore, the auxiliary elastic member can be arranged without constraints with respect to the slide member. Accordingly, a large installation space can be secured for the auxiliary elastic member without enlarging the power unit itself. Further, a large space can be secured for the expansion/contraction of the auxiliary elastic member. As a result, the size of the power unit can be reduced.

According to the present invention, the size of a power unit incorporating a clutch operation assisting device can be reduced.

Other features and advantages of the invention will be apparent from the following detailed description, taken in conjunction with the accompanying drawings which illustrate, by way of example, various features of embodiments of the invention.

DETAILED DESCRIPTION OF THE INVENTION

The present invention will now be described in detail with reference to the drawings.

(First Embodiment)

Figure 1:
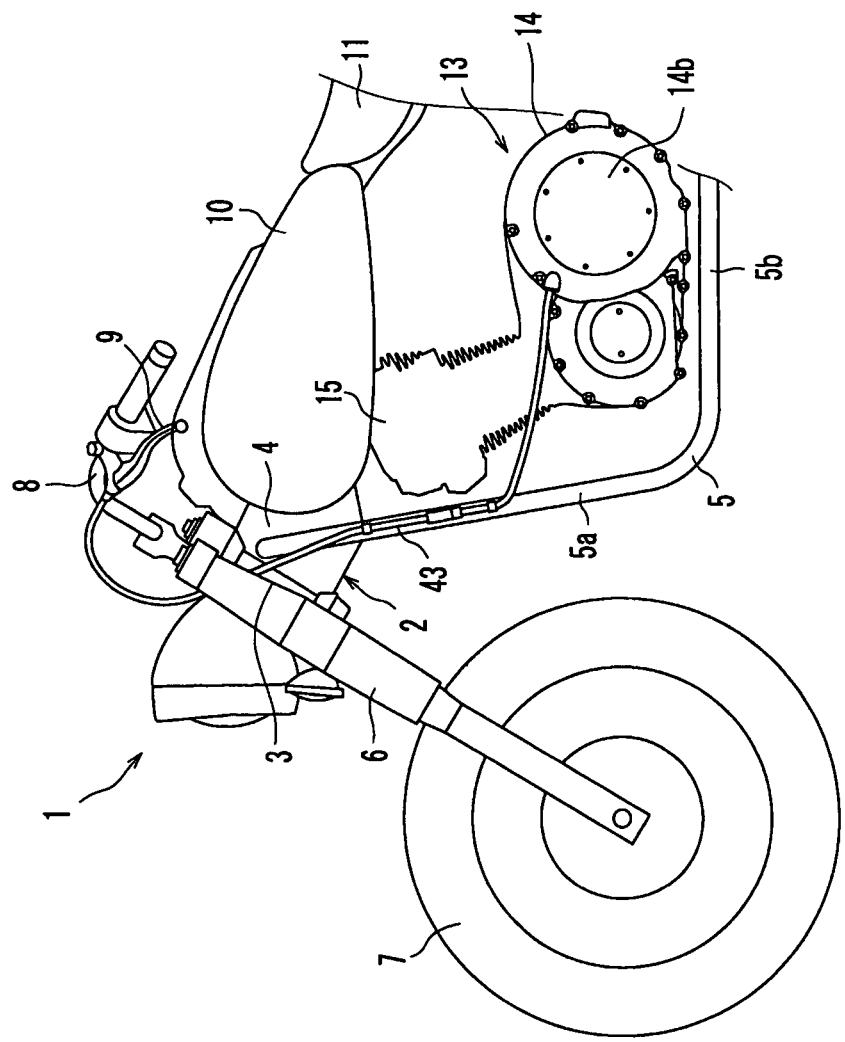
FIG. 1 is a left side view of a part of a motorcycle according to the invention.

A motorcycle 1 shown in FIG. 1 includes a frame 2. Frame 2 has a steering head pipe 3, a main frame member 4, and a down tube 5. Steering head pipe 3 supports a front fork 6. A steering handlebar 8 for steering a front wheel 7 is fixed to the upper end of front fork 6. A clutch lever 9 as an example of an operating member is attached to a left end portion of steering handlebar 8.

Main frame member 4 extends rearward from steering head pipe 3, and supports a fuel tank 10 and a seat 11. Down tube 5 has a first portion 5$a$ extending downward from the front end of main frame member 4, and a second portion 5$b$ extending rearward from the lower end of first portion 5$a$.

A power unit 13 is supported on frame 2. Power unit 13 has a crankcase 14 and a cylinder 15. As will be described later, a friction clutch 30 (see FIG. 2) is accommodated in crankcase 14. Clutch lever 9 and friction clutch 30 are connected to each other via a clutch wire 43 (transmission member). Clutch lever 9, clutch wire 43, and friction clutch 30 constitute a clutch operating apparatus for manually connecting/disconnecting transmission of torque within power unit 13.

Figure 2:
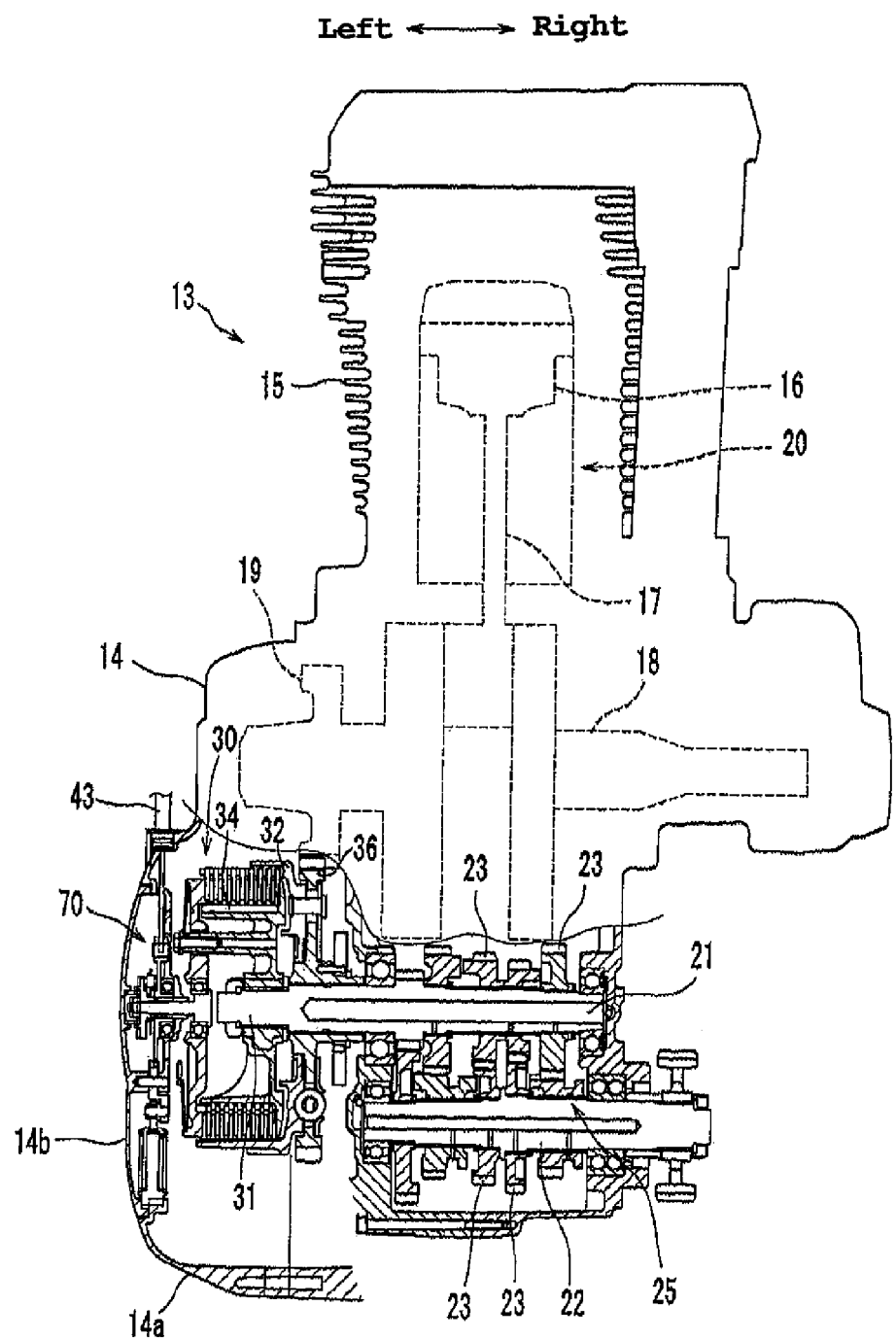
FIG. 2 is a partially cut away sectional view of a power unit according to the invention.

As shown in FIG. 2, an engine 20 is provided inside power unit 13. Engine 20 includes a piston 16, a crankshaft 18, and a connecting rod 17 connecting piston 16 and crankshaft 18. Inside crankcase 14, a main shaft 21 and a drive shaft 22 are arranged in parallel to crankshaft 18. A plurality of gears 23 are provided around main shaft 21 and drive shaft 22. Main shaft 21, drive shaft 22, and gears 23 form a transmission 25.

Friction clutch 30 is provided on the left end of main shaft 21. For the sake of convenience, the portion of main shaft 21 where friction clutch 30 is provided is referred to herein as a clutch shaft 31. It should be noted, however, that in this embodiment, clutch shaft 31 is a part of main shaft 21, and clutch shaft 31 and main shaft 21 are formed integrally with each other.

Figure 3:
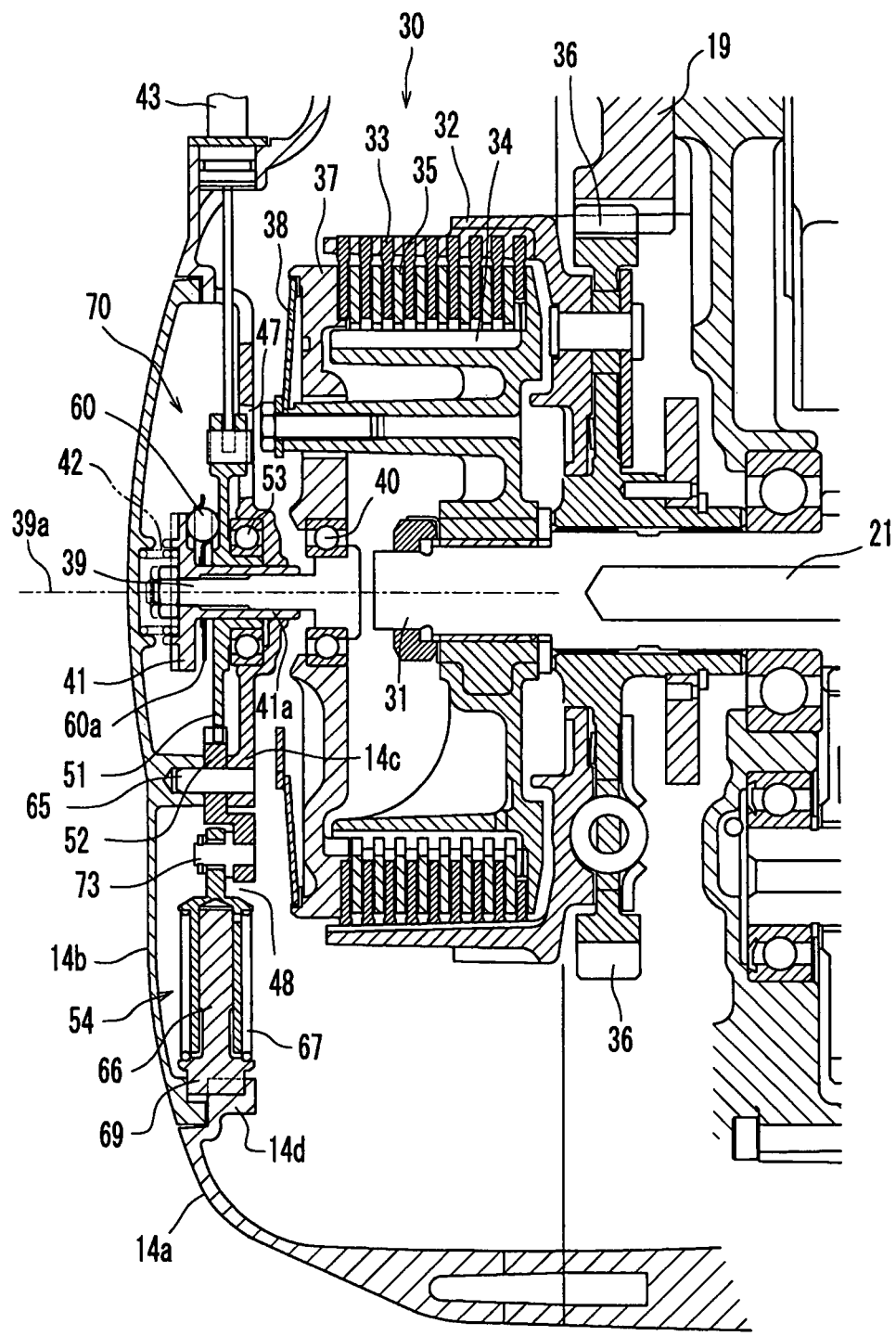
FIG. 3 is a sectional view of a clutch operation assisting device according to the invention.

As shown in FIG. 3, friction clutch 30 according to this embodiment is a multiplate wet friction clutch. However, the present invention is not limited to a multiplate wet friction clutch. Friction clutch 30 includes a clutch housing 32 and a clutch boss 34. Clutch housing 32 is rotatably supported on clutch shaft 31. Clutch boss 34 is supported on and rotates integrally with clutch shaft 31.

A plurality of friction plates 33 are provided in clutch housing 32, and a plurality of clutch plates 35 are provided in clutch boss 34. Friction plates 33 and clutch plates 35 are arranged side by side in a staggered fashion along the axial direction (lateral direction) of clutch shaft 31.

As shown in FIG. 2, a drive gear 19 is fixed to the left end of crankshaft 18. A driven gear 36 is fixed to clutch housing 32. Drive gear 19 and driven gear 36 mesh with each other so that driven gear 36 rotates in accordance with drive gear 19. Accordingly, clutch housing 32 rotates in accordance with crankshaft 18. Drive gear 19 and driven gear 36 constitute a speed reduction mechanism.

As shown in FIG. 3, a pressure plate 37 is arranged on the left side of clutch shaft 31. A clutch spring 38 comprising a diaphragm spring is attached to pressure plate 37. It should be noted that the kind of clutch spring 38 is not particularly limited. Pressure plate 37 is slidable in the axial direction of clutch shaft 31, and is constantly urged by clutch spring 38 to the clutch boss 34 side (the right side in FIG. 3). As pressure plate 37 moves to the clutch boss 34 side to press on friction plates 33, friction plates 33 and clutch plates 35 come into pressure contact with each other, thereby bringing friction plate 30 into an engaged state (clutch-in state). On the other hand, when pressure plate 37 separates from clutch boss 34, the pressure contact between friction plates 33 and clutch plates 35 is released, thereby bringing friction clutch 30 into a disengaged state (clutch-out state).

Crankcase 14 includes a case body 14a having a bearing plate 14c, and a clutch cover 14b. Bearing plate 14c is arranged on the outer side (left side) of pressure plate 37. Clutch cover 14b is arranged on the outer side of bearing plate 14c. Clutch cover 14b covers friction clutch 30 together with bearing plate 14c. Clutch cover 14b also covers a clutch operation assisting device 70 that will be described later.

A push shaft 39 (slide member) is supported on bearing plate 14c. Push shaft 39 is arranged on the same straight line as clutch shaft 31 and on the outer side (left side) with respect to clutch shaft 31. Pressure plate 37 is rotatably supported on push shaft 39 via a bearing 40. Further, pressure plate 37 is non-axially movable with respect to push shaft 39, and slides axially in accordance with push shaft 39. Imaginary line 39a in FIG. 3 indicates the centerline of rotation of push shaft 39 and also corresponds to the centerline of rotation of pressure plate 37.

A cam plate 41 is attached to the left end of push shaft 39. In this embodiment push shaft 39 and cam plate 41 are separate components, however, push shaft 39 and cam plate 41 may be formed integrally. That is, a part of push shaft 39 may form cam plate 41. Cam plate 41 has a boss portion 41a. Push shaft 39 is fitted into boss portion 41a. A compression coil spring 42 is arranged between the left side of cam plate 41 and clutch cover 14b. Cam plate 41 is constantly urged rightward by compression coil spring 42.

Boss portion 41a of cam plate 41 extends through the center hole of a first rotary plate 51 and is axially movable with respect to first rotary plate 51. First rotary plate 51 is rotatably supported on bearing plate 14c via a bearing 53.

Figure 4:
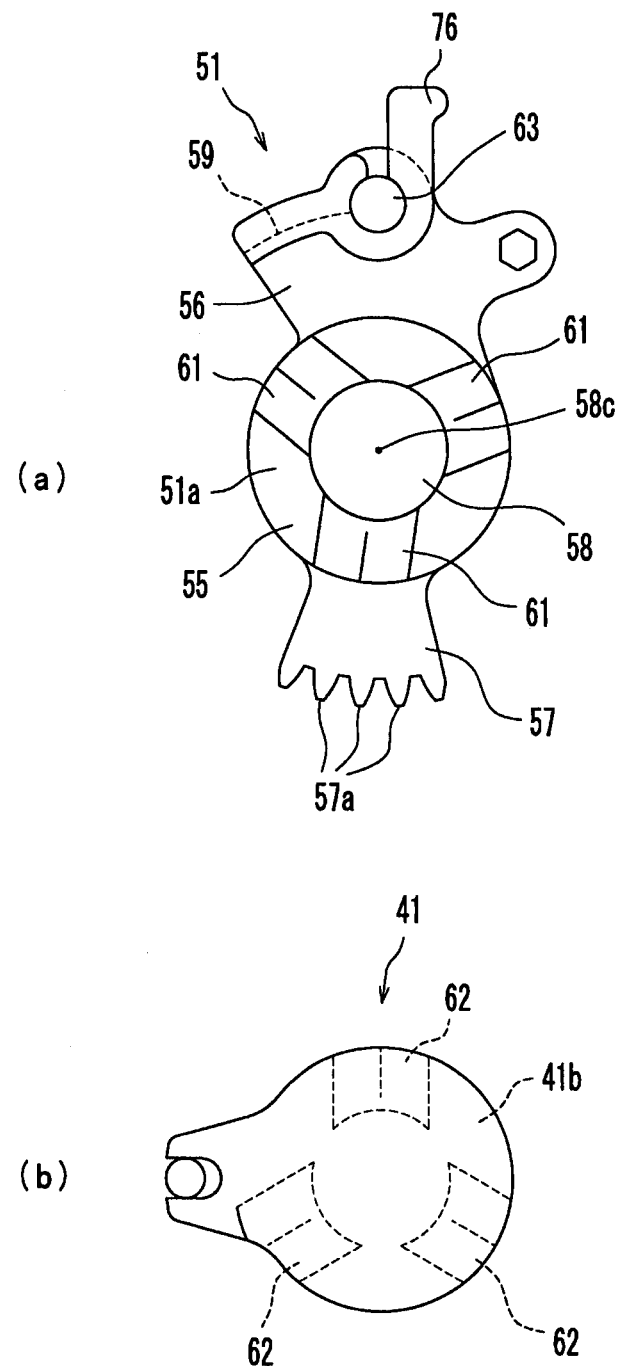
FIG. 4($a$) is a front view of a first rotary plate, and FIG. 4($b$) is a front view of a cam plate according to the invention.

As shown in FIG. 4(a), three cam grooves 61 are provided circumferentially in a front surface (the left-side surface in FIG. 3) 51a of first rotary plate 51. As shown in FIG. 4(b), similar cam grooves 62 are also formed in a back surface (the right-side surface in FIG. 3) 41b of cam plate 41. Cam grooves 61, 62 have a substantially V-shaped cross section. As shown in FIG. 3, a ball 60 is arranged between cam grooves 61 of first rotary plate 51 and cam grooves 62 of cam plate 41. A plate 60a prevents ball 60 from dropping off. A so-called ball-cam type cam mechanism is formed by cam grooves 61, 62 and ball 60. That is, as first rotary plate 51 rotates, ball 60 moves in cam grooves 61, 62, so cam plate 41 is pushed to the left side by ball 60. As a result, pressure plate 37 slides to the left side together with push shaft 39, thus bringing friction clutch 30 into a disengaged state.

Figure 5:
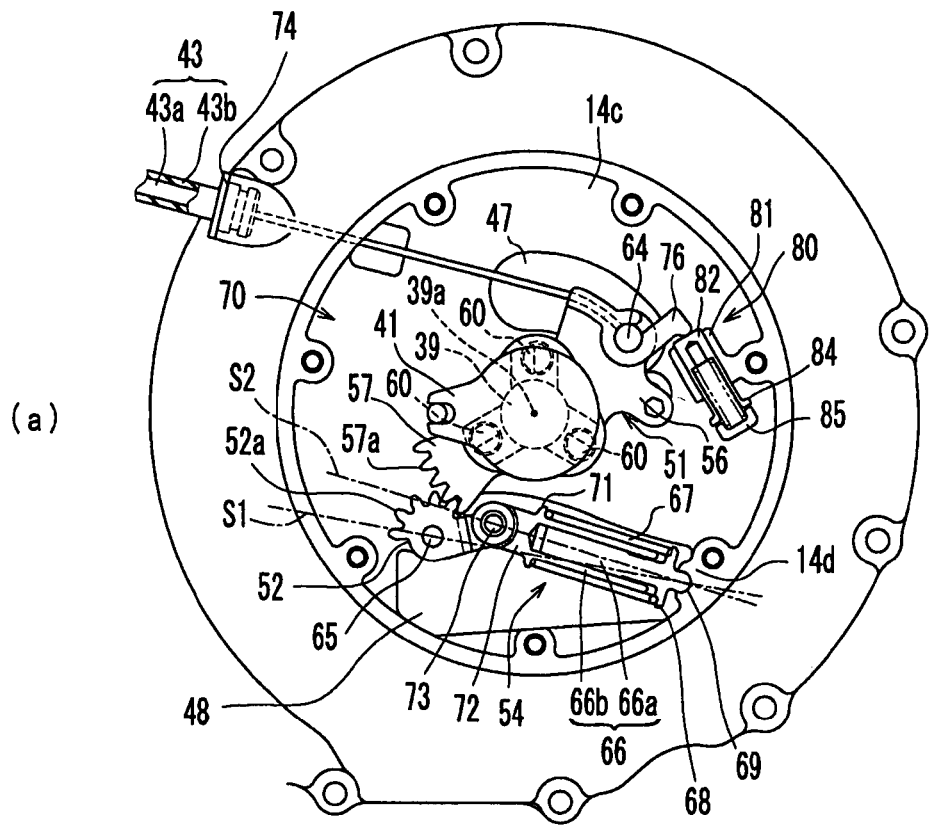
FIG. 5($a$) is a side view and FIG. 5($b$) is a sectional view of a clutch operation assisting device according to a first embodiment of the invention when a clutch lever is in a return position.
Figure 5:
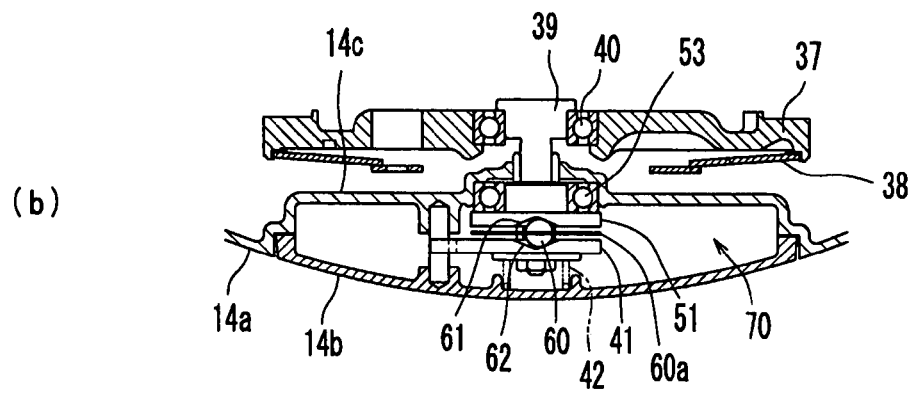

As shown in FIG. 5(a), clutch wire 43 includes an inner wire 43a made of metal covered by an outer tube 43b made of synthetic resin. Inner wire 43a is slidably inserted into outer tube 43b, and is led out from an end of outer tube 43b.

Clutch operation assisting device 70 includes, in addition to first rotary plate 51, a second rotary plate 52 and a spring unit 54. First rotary plate 51 may be, for example, a stamped sheet metal part. As shown in FIG. 4(a), first rotary plate 51 includes a substantially annular center portion 55, a wire connecting portion 56, and a gear portion 57. Wire connecting portion 56 and gear portion 57 are positioned on opposite sides across center portion 55.

In center portion 55, there is formed a hole 58 through which push shaft 39 is inserted. Cam grooves 61 are provided around hole 58. An engagement groove 59 and an engagement hole 63 are formed in wire connecting portion 56. Engagement groove 59 is a portion on which inner wire 43a of clutch wire 43 is wound. Engagement groove 59 is curved along a circular arc drawn about a center 58c of hole 58 and is formed in an upwardly open, substantially U-shaped configuration in cross section. As shown in FIG. 5(a), a cylindrical engaging member 64, which is fixed to the distal end of inner wire 43a, is hooked in engagement hole 63. Due to this construction, when inner wire 43a is pulled, first rotary plate 51 rotates counterclockwise about push shaft 39.

Second rotary plate 52 is supported on bearing plate 14c via a pivot shaft 65, and is rotatable about pivot shaft 65. Teeth 52a are formed in second rotary plate 52. Teeth 52a of second rotary pate 52 are in mesh with teeth 57a of gear portion 57 of first rotary plate 51. By means of teeth 52a and 57a, first rotary plate 51 and second rotary plate 52 are connected so as to allow mutual transmission of torque. Accordingly, second rotary plate 52 rotates in accordance with first rotary plate 51.

The distance from the rotation center (an axial center 39a of push shaft 39) of first rotary plate 51 to teeth 57a is longer than the distance from the rotation center (axial center of pivot shaft 54) of second rotary plate 52 to teeth 52a. Therefore, the rotation angle of second rotary plate 52 becomes larger than the rotation angle of first rotary plate 51.

Spring unit 54 includes a spring holder 66 and an auxiliary spring 67. Spring holder 66 includes an inner tube 66a and an outer tube 66b. Inner tube 66a and outer tube 66b are fitted with each other so as to be axially slidable. Spring holder 66 can expand and contract as outer tube 66b slides along inner tube 66a.

Inner tube 66a has a spring bearing 68 and a support end portion 69. Spring bearing 68 juts out in a flange-like shape from the outer peripheral surface at one end portion of inner tube 66a. Support end portion 69 is formed at one end of inner tube 66a, and is rotatably supported on a mounting seat 14d provided in bearing plate 14c.

Outer tube 66b has a spring bearing 71 and a connecting end portion 72. Spring bearing 71 juts out in a flange-like shape from the outer peripheral surface at one end portion of outer tube 66b. Connecting end portion 72 is formed at one end of outer tube 66b, and is connected to one end of second rotary plate 52 via a pin 73.

Auxiliary spring 67 (auxiliary elastic member) is a compression spring interposed in a compressed state between spring bearing 68 of inner tube 66a and spring bearing 71 of outer tube 66b. Spring holder 66 is thus constantly urged in an expanding direction. Auxiliary spring 67 changes in its expansion/contraction direction S2 with support end portion 69 taken as a fulcrum as it moves from a return position (see FIG. 5(a)), which will be described later, to a disengage position (see FIG. 7(a)) via a disengage start position (see FIG. 6(a)). As viewed from the axial direction of push shaft 39, the expansion/contraction direction S2 of auxiliary spring 67 and axial center 39a of push shaft 39 do not cross each other at any position.

A wire lead-in port 74 is formed in case body 14a of crankcase 14. Clutch wire 43 is inserted into wire lead-in port 74. Inner wire 43a of clutch wire 43 is led into crankcase 14 through wire lead-in port 74 and connected to wire connecting portion 56 of first rotary plate 51.

In addition to a hole through which push shaft 38 is passed, a first hole 47 and a second hole 48 are formed in bearing plate 14c. First hole 47 and second hole 48 are positioned on opposite sides across axial center 39a of push shaft 39. A part of wire connecting portion 56 of first rotary plate 51 enters first hole 47, and a part of second rotary plate 52 and spring unit 54 enter second hole 48 (see FIG. 3).

Clutch lever 9 can be rotated between a return position in which friction clutch 30 maintains the clutch-in state, and a disengage position in which friction clutch 30 is in the clutch-off state. A predetermined rotation range (for example, a rotation range in which the distal end of clutch lever 9 moves by a distance of 10 to 15 mm) from the return position is a so-called freeplay range in which the clutch-off state is maintained even when clutch lever 9 is gripped. In this freeplay range, clutch wire 43 is pulled only slightly even when clutch lever 9 is operated, so the urging force of clutch spring 38 is not transmitted to clutch lever 9. The end of the freeplay range of clutch lever 9 corresponds to the disengage start position. In the disengage start position, the urging force of clutch spring 38 is exerted on clutch lever 9 via clutch wire 43.

FIGS. 5(a) and 5(b) each show a state of the clutch operation assisting device 70 when clutch lever 9 is in the return position. In the return position, pin 73 connecting second rotary plate 52 and spring unit 54 is shifted above a straight line S1 that extends between support end portion 69 of spring holder 66 and pivot shaft 65 of second rotary plate 52.

When clutch lever 9 is moved from the return position to the disengage start position, first rotary plate 51 is pulled via clutch wire 43 and rotates counterclockwise. Since first rotary plate 51 and second rotary plate 52 are gear-coupled to each other, second rotary plate 52 then rotates clockwise. On the other hand, since second rotary plate 52 and spring unit 54 are pin-coupled to each other, spring unit 54 rotates counterclockwise with support end portion 69 as a fulcrum.

Figure 6:
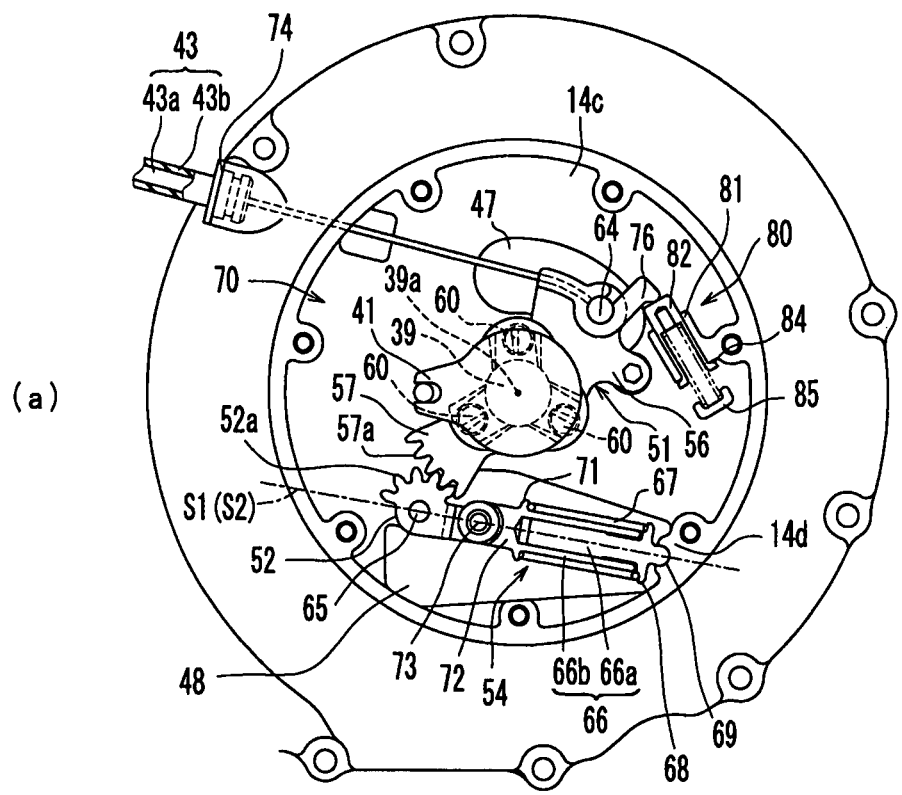
FIG. 6($a$) is a side view and FIG. 6($b$) is a sectional view of the clutch operation assisting device according to the first embodiment when the clutch lever is in a disengage start position.
Figure 6:
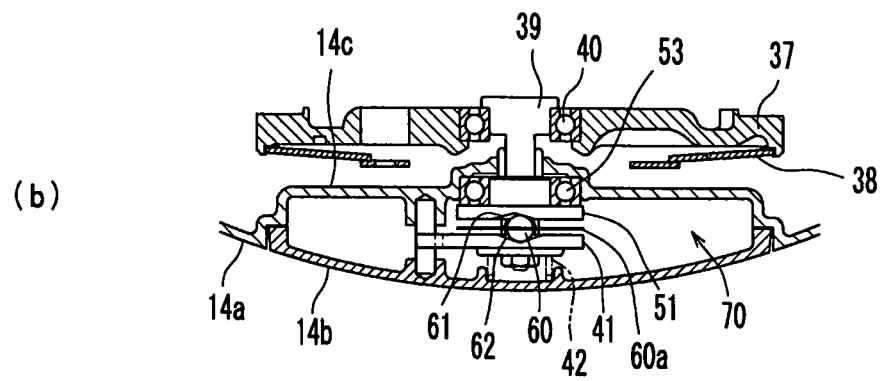

When clutch lever 9 reaches the disengage start position, as shown in FIG. 6(a), pin 73 is positioned on straight line S1 connecting between support end portion 69 of spring holder 66 and pivot shaft 65 of second rotary plate 52. Therefore, the urging force of auxiliary spring 67 does not act as a force for rotating second rotary plate 52, and hence does not act as a force for rotating first rotary plate 51.

Figure 7:
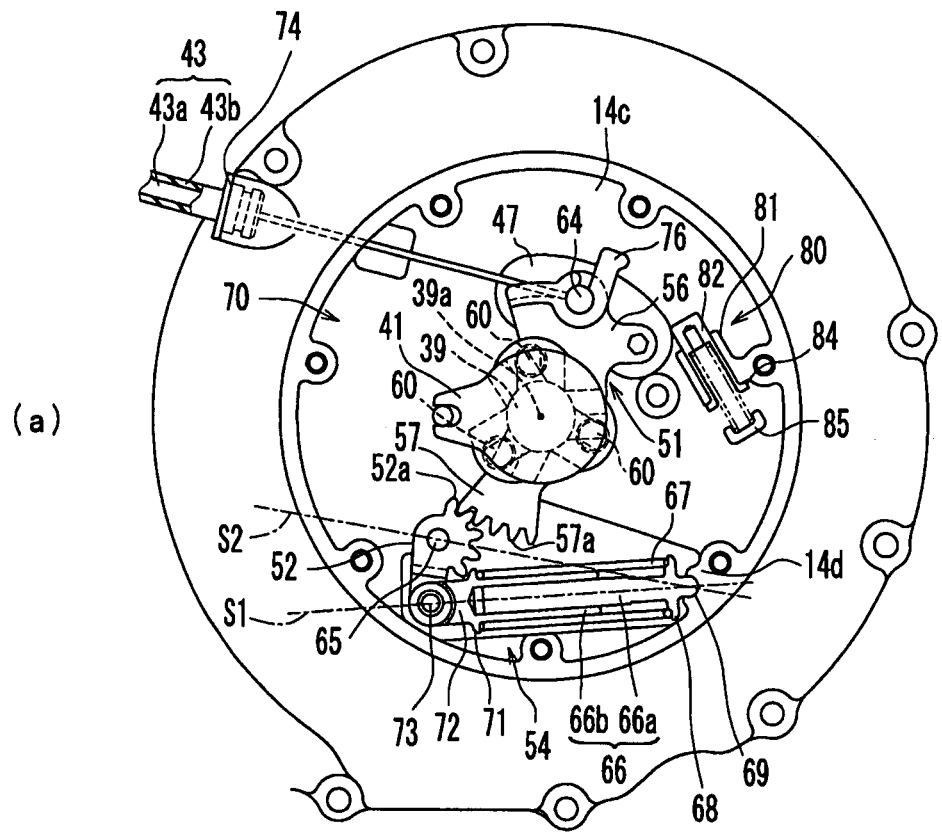
FIG. 7($a$) is a side view and FIG. 7($b$) is a sectional view of the clutch operation assisting device according to the first embodiment when the clutch lever is in a disengage position.
Figure 7:
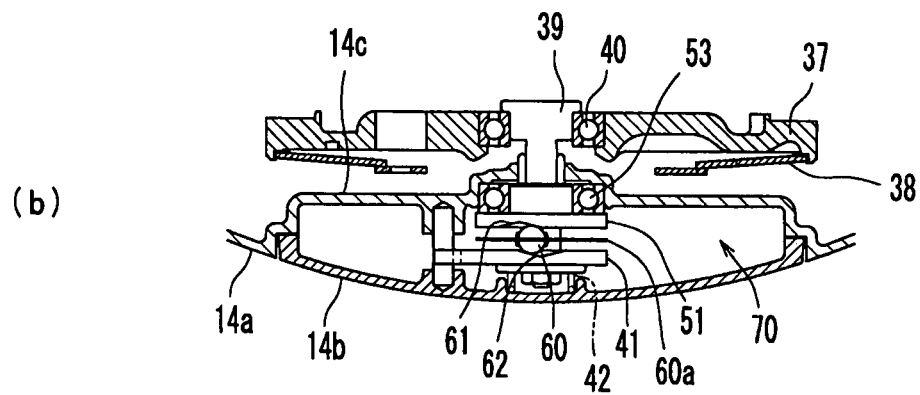

When clutch lever 9 is moved from the disengage start position toward the disengage position, first rotary plate 51 further rotates counterclockwise. Then, as shown in FIG. 7(b), cam groove 61 of first rotary plate 51 and cam groove 62 of cam plate 41 are shifted in position from each other, and ball 60 moves in both cam grooves 61, 62, so cam plate 41 is pushed to the outer side. Further, as shown in FIG. 7(a), as first rotary plate 51 rotates, second rotary plate 52 further rotates clockwise, and the position of pin 73 is shifted below straight line S1. As a result, spring holder 66 expands due to the urging force of auxiliary spring 67 which acts as a force for rotating second rotary plate 52 clockwise. As a result, the urging force of auxiliary spring 67 functions as an assist force for rotating first rotary plate 51 counterclockwise.

Accordingly, when clutch lever 9 is operated past the disengage start position toward the disengage position, first rotary plate 51 is forcibly rotated counterclockwise by means of auxiliary spring 67. That is, the urging force of auxiliary spring 67 is added to the operating force applied by the rider to clutch lever 9. The burden on the rider when operating clutch lever 9 is thus reduced.

As described above, in the state when clutch lever 9 is in the return position, as shown in FIG. 5(a), the position of pin 73 is shifted above straight line S1. Accordingly, due to the urging force of auxiliary spring 67, first rotary plate 51 is urged in the clockwise direction, that is, in a direction opposite to the direction for disengaging friction clutch 30.

This force urging first rotary plate 51 in the clockwise direction serves as a reverse assist force acting against the force for rotating clutch lever 9 from the return position to the disengage start position. Therefore, under these conditions, the initial input load required when initially gripping clutch lever 9 increases.

In view of this, a canceling spring unit 80 is provided for canceling out the above-mentioned reverse assist force. A housing portion 81 for accommodating canceling spring unit 80 is formed in bearing plate 14c.

Figure 8:
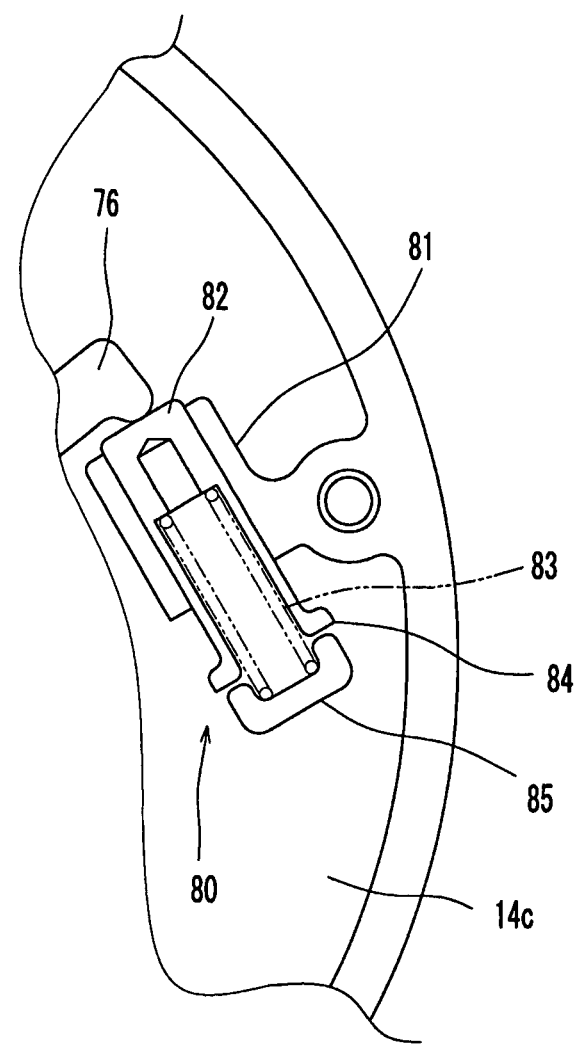
FIG. 8 is a side view of the clutch operation assisting device according to the first embodiment when the clutch lever is in the return position.

As shown in FIG. 8, canceling spring unit 80 has a pressing pin 82 and a canceling spring 83. A flange-like stopper 84 is formed at the lower end of pressing pin 82. Pressing pin 82 is inserted into housing portion 81 from the lower side.

Bearing plate 14c is provided with a spring bearing 85 that supports the lower end of canceling spring 83. Canceling spring 83 is a compression coil spring, and is interposed in a compressed state between the upper-end inner surface of pressing pin 82 and spring bearing 85. Canceling spring 83 constantly urges pressing pin 82 obliquely upward along the longitudinal direction of housing portion 81. The urging force of canceling spring 83 is set to be slightly smaller than the counter assist force exerted by auxiliary spring 67.

Pressing pin 82 is movable between a first position (see FIGS. 6(a) and 7(a)) where its upper end largely projects from housing portion 81, and a second position (see FIG. 5(a)) where the upper end of pressing pin 82 slightly projects from housing portion 81. When in the first position, stopper 84 of pressing pin 82 abuts on the lower end of housing portion 81 to thereby limit the position of pressing pin 82. When in the second position, stopper 84 of pressing pin 82 abuts on spring bearing 85 to thereby limit the position of pressing pin 82.

During the period of time until clutch lever 9 reaches the disengage start position from the return position, the upper end of pressing pin 82 abuts on an abutting portion 76 of first rotary plate 51 (see FIG. 5(a)). First rotary plate 51 thus receives the urging force of canceling spring 83. As a result, when clutch lever 9 is in the range of freeplay, the total of the urging forces of auxiliary spring 67 and canceling spring 83 applied to first rotary plate 51 becomes substantially zero, so the rotation of first rotary plate 51 in the clockwise direction is restricted.

As clutch lever 9 moves past the disengage start position and approaches the disengage position, abutting portion 76 of first rotary plate 51 separates from the upper end of pressing pin 82 (see FIG. 7(a)). As a result, the urging force of canceling spring 83 applied to first rotary plate 51 becomes zero, so first rotary plate 51 is forcibly rotated counterclockwise by the urging force of auxiliary spring 67.

As described above, clutch operation assist device 70 according to this embodiment includes push shaft 39, first rotary plate 51, and auxiliary spring 67. Push shaft 39 rotatably supports pressure plate 37, and slides axially together with pressure plate 37. First rotary plate 51 is connected to clutch wire 43, and rotates in accordance with clutch wire 43, thereby causing push shaft 39 to slide. When operating clutch lever 9 in the direction for disengaging friction clutch 30, during the period of time until clutch lever 9 reaches the disengage position where the disengagement of friction clutch 30 is complete from the disengage start position where friction lever 9 receives the reaction force of clutch spring 38, auxiliary spring 67 applies an urging force for causing first rotary plate 51 to rotate in the direction for disengaging friction plate 30, while changing in its expansion/contraction direction S2. Further, clutch operation assisting device 70 is configured such that as viewed from the axial direction (sliding direction) of push shaft 39, the expansion/contraction direction S2 of auxiliary spring 67 does not pass through axial center 39a of push shaft 39 (the rotation center of pressure plate 37) (see FIG. 5 or the like).

Therefore, there is no need to install auxiliary spring 67 along the radial direction from axial center 39a of push shaft 39, so auxiliary spring 67 can be installed relatively freely without the constraint of push shaft member 39. A large installation space can be thus secured for auxiliary spring 67 without enlarging crankcase 14 of power unit 13. Accordingly, the size of power unit 13 can be reduced.

Further, since a large space can be secured for the expansion/contraction of auxiliary spring 67, the expansion/contraction length of auxiliary spring 67 can be increased. Thus, even without using an expensive spring, a large expansion/contraction length can be secured, and a sufficient urging force obtained. Therefore, the cost of clutch operation assisting device 70 can be reduced.

Further, as shown in FIG. 5(a) or the like, clutch operation assisting device 70 includes pivot shaft 65 supported on bearing plate 14c. Second rotary plate 52 is supported on pivot shaft 65 and rotates to transmit the urging force of auxiliary spring 67 to first rotary plate 51. As viewed from the axial direction of push shaft 39, the position of pivot shaft 65 (the axial center of pivot shaft 65 serves as the rotation center of second rotary plate 52) and the position of push shaft 39 are shifted from each other.

As described above, instead of connecting spring unit 54 and first rotary plate 51 directly to each other, second rotary plate 52 for imparting the urging force of auxiliary spring 67 to first rotary plate 51 is interposed between spring unit 54 and first rotary plate 51. Constraints on the installation position of auxiliary spring 67 are thus further reduced, thereby facilitating size reduction of power unit 13.

Further, in clutch operation assisting device 70, first rotary plate 51 and second rotary plate 52 are connected such that the rotation angle of second rotary plate 52 becomes larger than the rotation angle of first rotary plate 51.

Accordingly, torque is amplified as it is transmitted from first rotary plate 52 to first rotary plate 51. Therefore, the urging force required of auxiliary spring 67 can be made small. As a result, a small-volume spring can be used, which makes it possible reduce the size and cost of auxiliary spring 67.

Further, in this embodiment, first rotary plate 51 includes wire connecting portion 56 connected to clutch wire 43, and gear portion 57 connected to second rotary plate 52. As viewed from the axial direction of clutch shaft 31, wire connecting portion 56 and gear portion 57 are positioned on opposite sides across push shaft 39.

Accordingly, wire connecting portion 56 and gear portion 57 can be compactly arranged, thereby facilitating a reduction in the size of power unit 13.

Further, in this embodiment, bearing plate 14c has mounting seat 14d that supports one end of auxiliary spring 67 (specifically, support end portion 69 of spring holder 66) in a swingable manner.

Accordingly, auxiliary spring 67 can be made to swing largely about one end of auxiliary spring 67 as a fulcrum. A large urging force can be thus exerted even when auxiliary spring 67 used is a relatively small one. Bearing plate 14c as a support member may directly support auxiliary spring 67 or may indirectly support auxiliary spring 67 via another member.

Further, clutch operation assisting device 70 according to this embodiment includes bearing plate 14c positioned between friction clutch 30 and first rotary plate 51, with holes 47 and 48 being formed in bearing plate 14c.

Accordingly, first rotary plate 51 is securely supported by bearing plate 14c, thereby securing a sufficient strength. Further, lubricating oil can be supplied from friction clutch 30 side to first rotary plate 51 side through holes 47, 48. Wear of the sliding portion of clutch operation assisting device 70 can thereby be reduced.

According to this embodiment, a part of first rotary plate 51 (more specifically, a part of wire connecting portion 56) is inserted into hole 47 of bearing plate 14c. Further, auxiliary spring 67 is inserted into hole 48 of bearing plate 14c. Furthermore, a part of second rotary plate 52 is also inserted into hole 48.

Accordingly, the size of power unit 13 with respect to the width direction (which corresponds to the axial direction of push shaft 39 and is the lateral direction in this embodiment) can be reduced by the amount of overlap between first rotary plate 51 and bearing plate 14c. Further, the size of power unit 13 can be reduced by the amount of overlap between auxiliary spring 67 and bearing plate 14c. Furthermore, the size of power unit 13 can be reduced by the amount of overlap between second rotary plate 52 and bearing plate 14c. Power unit 13 is disposed in a so-called horizontal placement, and the width direction of power unit 13 coincides with the vehicle width direction. Downsizing of motorcycle 1 is thus facilitated.

According to this embodiment, as viewed from the axial direction of push shaft 39, first hole 47 and second hole 48 of bearing plate 14c are positioned on opposite sides across push shaft 39. This allows the rigidity of bearing plate 14c to be enhanced as compared with a case where both holes 47 and 48 are arranged in a concentrated fashion on one side.

Further, clutch operation assisting device 70 includes a ball-cam type cam mechanism for causing push shaft 39 to slide in accordance with the rotation of first rotary plate 51. More specifically, clutch operation assisting device 70 includes cam plate 41 that slides axially together with push shaft 39. Cam plate 41 has formed therein cam surface 41b, which extends in a direction orthogonal to push shaft 39 and in which cam grooves 62 are formed. First rotary plate 51 has formed therein cam surface 51a, in which cam grooves 61 are formed and which is faced to cam surface 41b of cam plate 41. Clutch operation assisting device 70 is arranged between cam grooves 62 of cam plate 41 and cam groves 61 of first rotary plate 51, and includes ball 60 for causing cam plate 41 to slide in the axial direction of push shaft 39 as first rotary plate 51 rotates.

Accordingly, first rotary plate 51 connected to clutch wire 43 itself functions as a cam plate, so there is no need for an additional pair of cam plates constituting a ball-cam type cam mechanism. Accordingly, the size of power unit 13 with respect to the width direction can be reduced also in this respect. In addition, downsizing of the vehicle can be facilitated.

Further, in this embodiment, cam plate 41 is provided at the outer end of push shaft 39, and first rotary plate 51 is arranged on the inner side with respect to cam plate 41. Therefore, first rotary plate 51 is arranged on the inner side with respect to ball 60. Accordingly, first rotary plate 51 can be arranged further inward, thereby facilitating a reduction in the size of power unit 13.

According to this embodiment, first gear teeth 57a are formed in first rotary plate 51, and second gear teeth 52a, which mesh with first gear teeth 57a within a plane orthogonal to push shaft 39, is formed in second rotary plate 52. That is, first rotary plate 51 and second rotary plate 52 are gear-coupled to each other.

First rotary plate 51 and second rotary plate 52 thus rotate within the same plane. The total axial length of first rotary plate 51 and second rotary plate 52 thus becomes small. It is thus possible to facilitate a reduction the size of power unit 13 with respect to the width direction.

However, it is of course possible to connect first rotary plate 51 and second rotary plate 52 to each other by a cam mechanism or the like. The configuration of the connection between first rotary plate 51 and second rotary plate 52 is therefore not limited to the one according to this embodiment.

Further, clutch operation assisting device 70 includes canceling spring 83 which, when clutch lever 9 is in the return position, applies an urging force for canceling out the urging force of auxiliary spring 67 applied to first rotary plate 51. The load required for the initial operation of clutch lever 9 is thus reduced, thereby improving operability of clutch lever 9.

(Second Embodiment)

In a second embodiment of the present invention, auxiliary spring 67 of spring unit 54 according to the first embodiment is changed from a compression coil spring to a tension coil spring.

Figure 9:
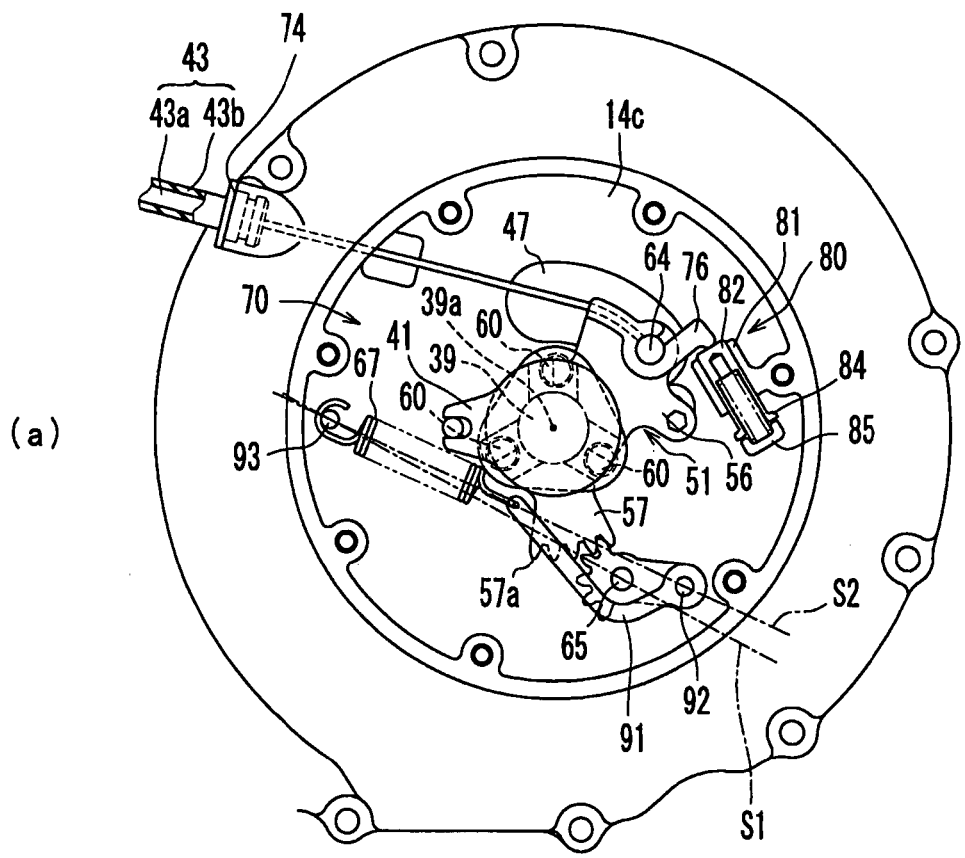
FIG. 9($a$) is a side view and FIG. 9($b$) is a sectional view of a clutch operation assisting device according to a second embodiment of the invention when the clutch lever is in a return position.
Figure 9:
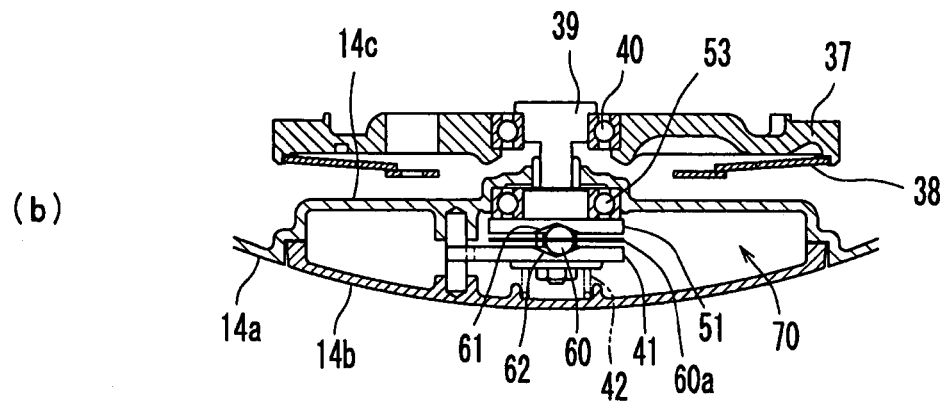

As shown in FIG. 9(*a*), spring unit 54 according to the second embodiment includes auxiliary spring 67 made of a tension coil spring, and a swing arm 91. One end of auxiliary spring 67 is hooked onto a pin 93 provided on bearing plate 14*c*. The other end of auxiliary spring 67 is fixed to one end of swing arm 91. The other end of swing arm 91 is connected to second rotary plate 52 by a pin 92. Swing arm 91 is rotatable with respect to second rotary plate 52. Otherwise, the second embodiment is of the same construction as the first embodiment.

As shown in FIG. 9(*a*), when clutch lever 9 is in the return position, pin 92 that connects second rotary plate 52 and spring unit 54 to each other is shifted above straight line S1 extending between pin 93 on one end side of auxiliary spring 67, and pivot shaft 65 of second rotary plate 52.

When the rider operates clutch lever 9 from the return position to the disengage start position, first rotary plate 51 is pulled via clutch wire 43, and first rotary plate 51 rotates counterclockwise. As a result, second rotary plate 52 rotates clockwise, and spring unit 54 rotates clockwise about pin 93 as a fulcrum.

Figure 10:
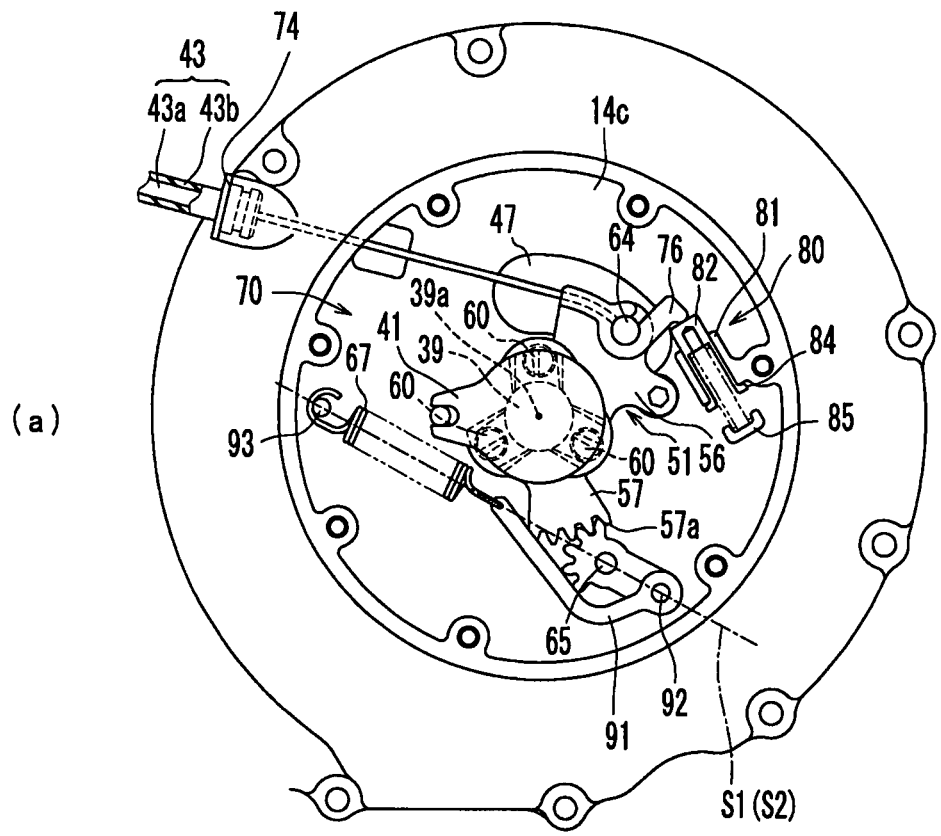
FIG. 10($a$) is a side view and FIG. 10($b$) is a sectional view of the clutch operation assisting device according to the second embodiment when the clutch lever is in a disengage start position.
Figure 10:
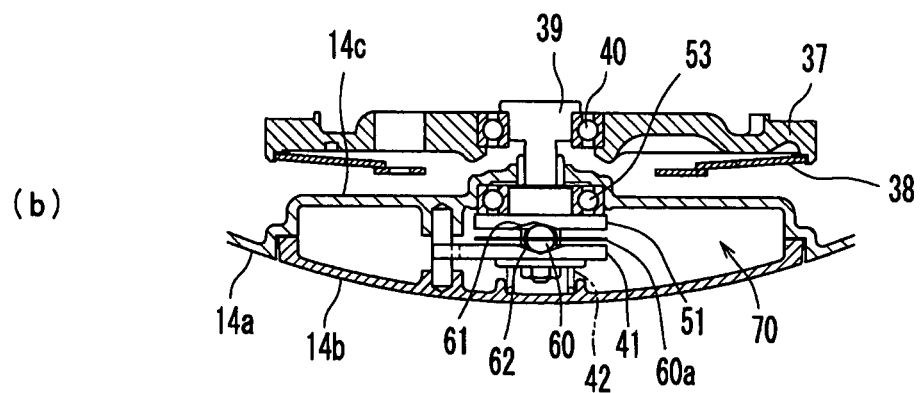

As shown in FIG. 10(*a*), when clutch lever 9 reaches the disengage start position, pin 92 is positioned on straight line Si. In this state, the urging force of auxiliary spring 67 does not act as a force for rotating second rotary plate 52+Therefore, the urging force of auxiliary spring 67 does not act as a force for rotating first rotary plate 51. As in the first embodiment, during the period of time until clutch lever 9 reaches the disengage start position from the return position, the reverse assist force exerted by auxiliary spring 67 is canceled out by canceling spring unit 80.

Figure 11:
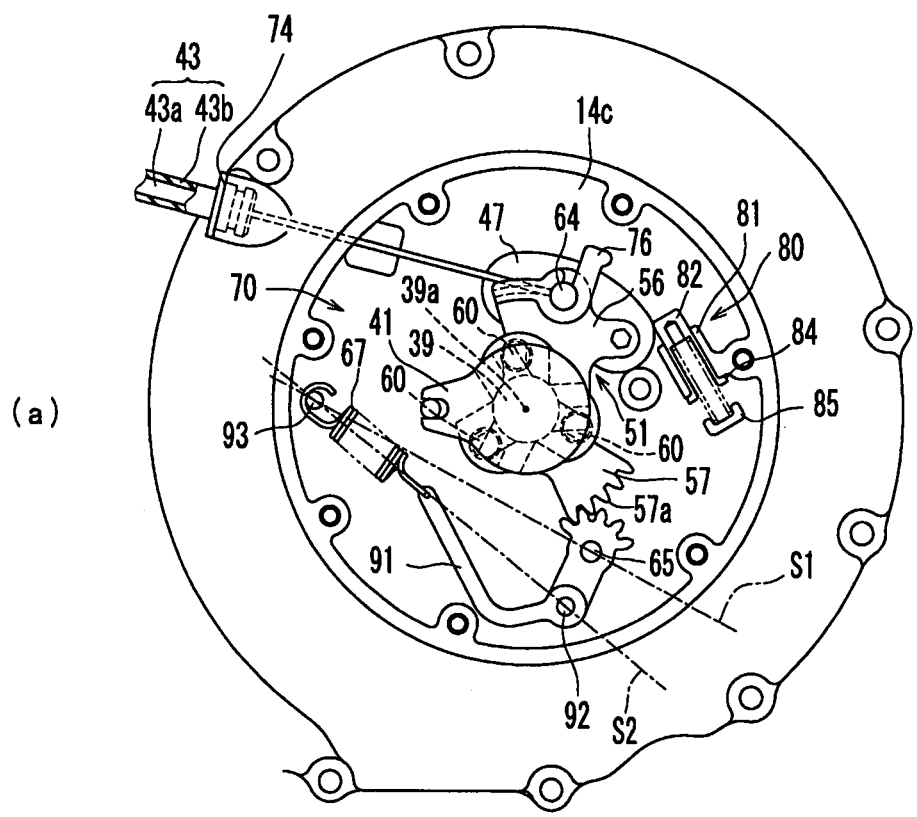
FIG. 11($a$) is a side view and FIG. 11($b$) is a sectional view of the clutch operation assisting device according to the second embodiment when the clutch lever is in a disengage position.
Figure 11:
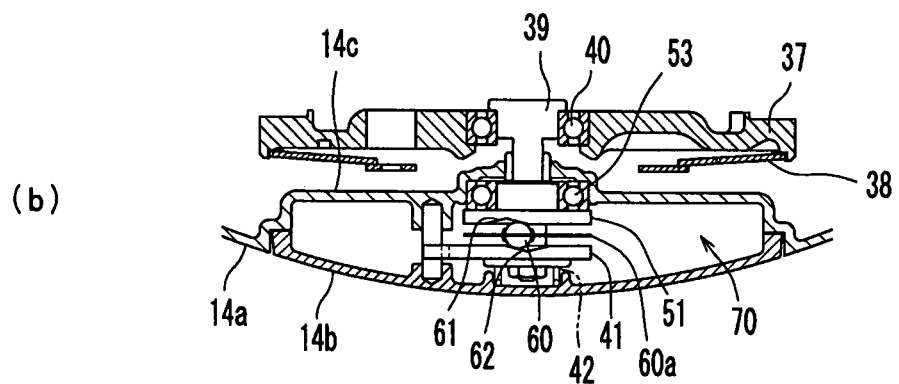

When clutch lever 9 is operated from the disengage start position toward the disengage position, first rotary plate 51 further rotates counterclockwise. Then, as shown in FIG. 11(*b*), cam plate 41 is pushed to the outer side by ball 60. Further, as shown in FIG. 11(*a*), due to the rotation of first rotary plate 51, second rotary plate 52 further rotates clockwise, so the position of pin 92 is shifted below straight line S1. As a result, the urging force of auxiliary spring 67 acts as a force for rotating second rotary plate 52 clockwise and for rotating first rotary plate 51 counterclockwise.

Accordingly, when clutch lever 9 is operated past the disengage start position toward the disengage position, first rotary plate 51 is forcibly rotated counterclockwise by auxiliary spring 67. That is, the urging force of auxiliary spring 67 is added to the operating force applied when the rider grips clutch lever 9. The burden on the rider when operating clutch lever 9 is thus reduced.

In this embodiment as well, auxiliary spring 67 expands/contracts while changing in its expansion/contraction direction as it moves from the return position to the disengage position via the disengage start position. Further, as viewed from the axial direction of push shaft 39, the expansion/contraction direction S2 of auxiliary spring 67 does not pass through axial center 39*a* of push shaft 39.

Therefore, this embodiment attains the same effect as that of the first embodiment.

(Third Embodiment)

Figure 12:
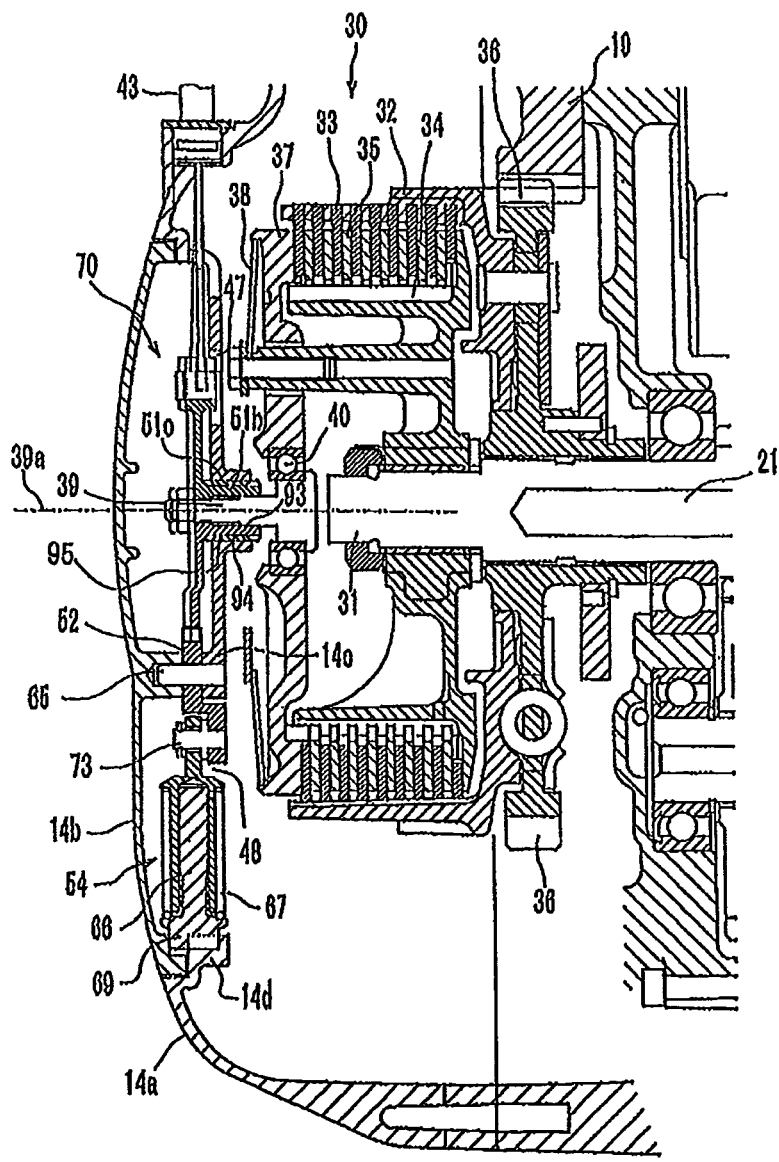
FIG. 12 is a sectional view of a clutch operation assisting device according to a third embodiment of the invention.
Figure 13:
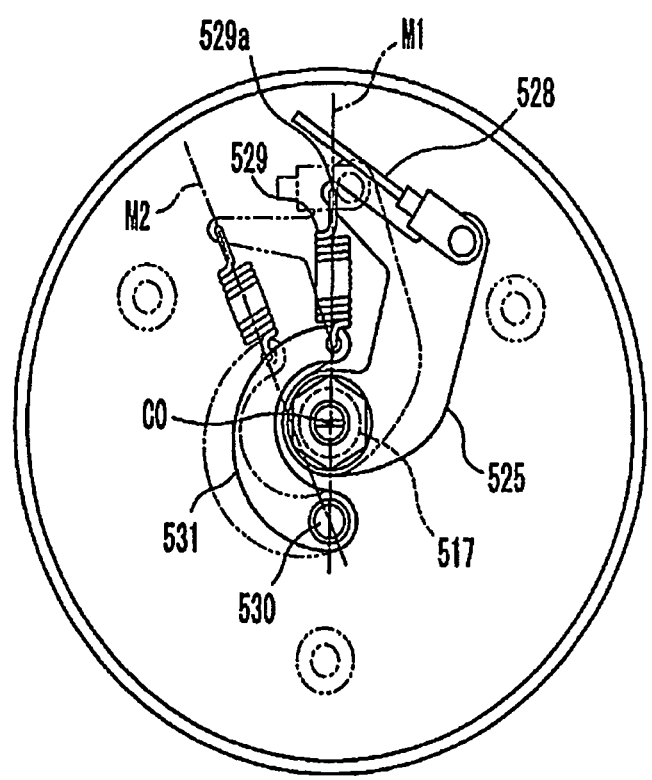
FIG. 13 is a side view of a clutch operation assisting device according to the related art.

In the first and second embodiments, a ball-cam type cam mechanism is employed as the cam mechanism for causing push shaft 39 to slide in accordance with the rotation of first rotary plate 51. However, the cam mechanism is not limited to a ball-cam type cam mechanism. As shown in FIG. 12, in a third embodiment of the present invention, the cam mechanism is modified.

As shown in FIG. 12, first rotary plate 51 is provided with a boss portion 51*b* extending to the inner side (friction clutch 30 side). A thread groove 51*c* is formed in the outer peripheral surface of boss portion 51*b*. That is, a spiral groove is formed in the outer peripheral surface of boss portion 51*b*.

A guide hole 95 is formed at the center portion of bearing plate 14*c*. Boss portion 51*b* of first rotary plate 51 is inserted into guide hole 95. A thread groove 94 if formed in the inner peripheral surface of guide hole 95 and engages with thread groove 51*c* of boss portion 51*b*. Thread groove 94 is formed so as to guide first rotary plate S1 in the axial direction (the lateral direction in FIG. 12) in accordance with the rotation of first rotary plate 51.

In this embodiment, first rotary plate 51 and push shaft 39 are fixed, and first rotary plate 51 slides in the axial direction integrally with push shaft 39.

As described above, in this embodiment, the cam mechanism for causing push shaft 39 to slide in accordance with the rotation of first rotary plate 51 is formed by thread groove 51*c* of boss portion 51*b* of first rotary plate 51, and thread groove 94 of guide hole 95 in bearing plate 14*c*. Otherwise, the third embodiment is of the same construction as the first embodiment.

In this embodiment as well, auxiliary spring 67 expands/contracts while changing in its expansion/contraction direction as it moves from the return position to the disengage position via the disengage start position. As viewed from the axial direction of push shaft 39, the expansion/contraction direction of auxiliary spring 67 does not pass through axial center 39*a* of push shaft 39. Therefore, this embodiment attains the same effect as that of the first embodiment.

According to this embodiment, as compared with the first embodiment, cam plate 41 and ball 60 are unnecessary. The size of power unit 13 can therefore be further reduced with respect to the width direction.

In this embodiment, the cam mechanism for causing push shaft 39 to slide in accordance with the rotation of first rotary plate 51 is formed by thread groove 51*c* of boss portion 51*b* of first rotary plate 51, and thread groove 94 of guide hole 95 in bearing plate 14*c*. However, the cam mechanism is not limited to a screw-type cam mechanism. For example, the cam mechanism may be formed by a radially protruding pin provided in the outer peripheral surface of boss portion 51*b*, and a spiral guide groove in which the pin is inserted formed in the inner peripheral surface of guide groove 95.

(Other Embodiments)

In each of the above-mentioned embodiments, the clutch operation assisting device according to the present invention is applied to a motorcycle. However, the clutch operation assisting device according to the present invention is also applicable to other straddle-type vehicles as well as other types of vehicles.

In the present invention, the pressure plate refers to any member for bring the friction plates and clutch plates of the friction clutch into pressure contact with each other, and is not limited to a plate-shaped member The clutch spring is not limited to a diaphragm spring, and may be another kind of spring such as a coil spring.

In the above-described embodiments, push shaft 39 corresponds to the "slide member" of the present invention. However, the slide member is not limited to push shaft 39. Any member may serve as the slide member as long as it rotatably supports pressure plate 37 and slides in a predetermined direction together with the above-mentioned pressure plate 37. Further, the slide member may be either a single member or a combination of two or more members.

While in the above-mentioned embodiments the rotation center of the first rotary member (first rotary plate 51) and the rotation center of pressure plate 37 coincide with each other as viewed from the sliding direction of the slide member (the axial direction of push shaft 39), they may be shifted from each other. In that case, a seesaw-like member may be provided between cam plate 41 and push shaft 39. Accordingly, by rotating the first rotary member in accordance with a transmission member, the slide member can be made to slide. Otherwise, the mechanism for causing the slide member to slide may be of any type as long as it includes the first rotary member.

The "transmission member" according to the present invention is not limited to a wire-like member but may be a rod-like member as well.

The "auxiliary elastic member" according to the present invention is not limited to a coil spring but may be another kind of elastic member such as a gas spring.

In the above-mentioned embodiments, first rotary plate 51 and second rotary plate 52 are gear-coupled to each other. However, first rotary plate 51 and second rotary plate 52 may be connected to each other by another form of connection such as a link connection.

As described above, the present invention is useful for application to a clutch operation assisting device for reducing the operating force for operating a friction clutch, and a power unit and a saddle vehicle that are equipped with the clutch operation assisting device.

The particular embodiments of the invention described in this document should be considered illustrative, rather than restrictive. Modification to the described embodiments may be made without departing from the spirit of the invention as defined by the following claims.

the invention claimed is:

1. A clutch operation assisting device provided in a clutch operating apparatus, the clutch operating apparatus including:
    a friction clutch that has a pressure plate and a clutch spring for urging the pressure plate, and is arranged in a casing of a power unit; and
    an operating member that is connected to the friction clutch via a transmission member, and is manually operated against an urging force of the clutch spring when disengaging transmission of torque by the friction clutch, wherein the clutch operation assisting device is accommodated in the power unit casing and comprises:
    a slide member that rotatably supports the pressure plate and slides in a predetermined direction together with the pressure plate;
    a first rotary member that is connected to the transmission member, and rotates in accordance with the transmission member to cause the slide member to slide, the first rotary member having a hole formed therein in which a portion of the slide member is disposed, and including a gear portion; and
    an auxiliary elastic member for, when operating the operating member in a direction for disengaging the friction clutch, applying an urging force to the gear portion of the first rotary member while changing in its expansion/contraction direction during a period of time until the operating member reaches a disengage position where disengagement of the friction clutch is complete from a disengage start position where the operating member receives a reaction force of the clutch spring, the urging force causing the first rotary member to rotate in the direction for disengaging the friction clutch, wherein as viewed from a sliding direction of the slide member, the expansion/contraction direction of the auxiliary elastic member is offset from the rotation center of the pressure plate in both an operated position and a return position of the operating member.

2. The clutch operation assisting device according to claim 1, further comprising a second rotary member that rotates to transmit the urging force of the auxiliary elastic member to the first rotary member, wherein as viewed from the sliding direction of the slide member, the rotation center of the second rotary member and the rotation center of the pressure plate are shifted from each other.

3. The clutch operation assisting device according to claim 2, wherein the first rotary member and the second rotary member are connected to each other such that a rotation angle of the second rotary member becomes larger than a rotation angle of the first rotary member.

4. The clutch operation assisting device according to claim 2, wherein:
    the first rotary member further includes a connecting portion connected to the transmission member; and
    as viewed from the sliding direction of the slide member, the connecting portion and the gear portion are positioned on opposite sides across the slide member.

5. The clutch operation assisting device according to claim 2, further comprising a support plate for supporting the slide member, the support plate being arranged between the friction clutch and the first rotary member and having at least one hole formed therein, wherein at least a part of the second rotary member is inserted into the at least one hole of the support plate.

6. The clutch operation assisting device according to claim 2, wherein:
    the first rotary member has first gear teeth formed therein; and
    the second rotary member has formed therein second gear teeth that mesh with the first gear teeth within a plane orthogonal to the sliding direction of the slide member.

7. The clutch operation assisting device according to claim 1, further comprising a support member for supporting the slide member, wherein the support member has a support portion for supporting one end side of the auxiliary elastic member in a swingable manner.

8. The clutch operation assisting device according to claim 1, further comprising a support plate for supporting the slide member, the support plate being arranged between the friction clutch and the first rotary member and having at least one hole formed therein.

9. The clutch operation assisting device according to claim 8, wherein at least a part of the auxiliary elastic member is inserted into the at least one hole of the support plate.

10. The clutch operation assisting device according to claim 8, wherein at least a part of the first rotary member is inserted into the at least one hole of the support plate.

11. The clutch operation assisting device according to claim 1, further comprising a support plate for supporting the slide member, the support plate being arranged between the friction clutch and the first rotary member and having first and second holes formed therein, wherein as viewed from the sliding direction of the slide member, the first hole and the second hole are positioned on opposite sides across the slide member.

12. The clutch operation assisting device according to claim 1, further comprising a cam plate having a cam surface extending in a direction orthogonal to the sliding direction of the slide member and in which a cam groove is formed, the cam plate being adapted to slide together with the slide member, wherein:
the first rotary member has a cam surface in which a cam groove is formed and which is faced to the cam surface of the cam plate; and
the clutch operation assisting device further comprises a ball arranged between the cam groove of the cam plate and the cam groove of the first rotary member, the ball causing the cam plate to slide in the sliding direction of the slide member as the first rotary member rotates.

13. The clutch operation assisting device according to claim 12, wherein: the cam plate is provided at an outer end of the slide member; and the first rotary member is arranged on an inner side with respect to the cam plate.

14. The clutch operation assisting device according to claim 1, wherein:
the first rotary member and the slide member are connected to each other so as to slide integrally in the sliding direction of the slide member;
the first rotary member includes a boss portion;
the clutch operation assisting device further comprises a support member for supporting the slide member, the support member having formed therein a guide hole into which the boss portion is inserted; and
the boss portion and the guide hole each have formed therein a cam mechanism for guiding the first rotary member in the sliding direction of the slide member as the first rotary member rotates.

15. The clutch operation assisting device according to claim 1, wherein:
the auxiliary elastic member is configured such that when the operating member is in another return position located on a return side with respect to the disengage start position, the auxiliary elastic member urges the first rotary member in a direction for engaging the friction clutch, and as the operating member is operated from the return position toward the disengage position via the disengage start position, a direction of urging force exerted on the first rotary member changes from the direction for engaging the friction clutch to the direction for disengaging the friction clutch;
and the clutch operation assisting device further comprises a canceling elastic member for, when the operating member is in the return position, applying an elastic force for canceling out the urging force of the auxiliary elastic member applied to the first rotary member.

16. A straddle-type vehicle comprising the clutch operating assisting device according to claim 1.

17. The clutch operation assisting device according to claim 1, wherein the first rotary member rotates about the rotation center of the pressure plate.

18. A power unit for a vehicle, comprising:
a friction clutch that has a pressure plate and a clutch spring for urging the pressure plate, and is connected via a transmission member to an operating member that is operated manually against an urging force of the clutch spring;
a slide member that rotatably supports the pressure plate and slides in a predetermined direction together with the pressure plate;
a first rotary member that is connected to the transmission member, and rotates in accordance with the transmission member to cause the slide member to slide, the first rotary member having a hole formed therein in which a portion of the slide member is disposed, and including a gear portion;
an auxiliary elastic member for, when operating the operating member in a direction for disengaging the friction clutch, applying an urging force to the gear portion of the first rotary member while changing in its expansion/contraction direction during a period of time until the operating member reaches a disengage position where disengagement of the friction clutch is complete from a disengage start position where the operating member receives a reaction force of the clutch spring, the urging force causing the first rotary member to rotate in the direction for disengaging the friction clutch; and
a casing that accommodates the friction clutch, the slide member, the first rotary member, and the auxiliary elastic member, wherein as viewed from a sliding direction of the slide member, the expansion/contraction direction of the auxiliary elastic member is offset from the rotation center of the pressure plate in both an operated position and a return position of the operating member.

19. A straddle-type vehicle comprising the power unit for a vehicle as set forth in claim 18.

* * * * *